United States Patent [19]

Brice

[11] 4,257,345
[45] Mar. 24, 1981

[54] ELECTROSTATIC POWDER COATING INSTALLATION

[75] Inventor: Larry D. Brice, Athens, Ga.

[73] Assignee: Westinghouse Electric Corp., Pittsburgh, Pa.

[21] Appl. No.: 944,446

[22] Filed: Sep. 21, 1978

[51] Int. Cl.³ ............................................. B05C 15/00
[52] U.S. Cl. ...................................... 118/634; 55/351; 55/487; 118/603; 118/DIG. 7
[58] Field of Search ................. 118/634, DIG. 7, 603, 118/610, 309, 326; 55/351, 353, 354, 486, 487, 528; 98/115 SB; 239/693

[56] References Cited

U.S. PATENT DOCUMENTS

| 1,818,391 | 8/1931 | Greene | 55/351 X |
|---|---|---|---|
| 3,552,099 | 1/1971 | Floyd | 55/354 |
| 3,717,978 | 2/1973 | Osborne, Jr. | 55/351 X |
| 3,744,450 | 7/1973 | Hardy | 118/634 X |
| 3,918,641 | 11/1975 | Lehmann et al. | 118/634 X |
| 4,153,008 | 5/1979 | Marino et al. | 118/634 |

*Primary Examiner*—John P. McIntosh
*Attorney, Agent, or Firm*—D. R. Lackey

[57] ABSTRACT

Electrostatic powder coating installation includes an enclosure through which a movable filter belt extends. A suction device draws air and excess powder towards one face of the filter belt which has a predetermined permeability so as to collect the powder on one face thereof and to allow air to flow therethrough to an exhaust plenum. A second movable belt formed of a coarse, monofilament, screen material is disposed in registry with the other face of the filter belt to prevent contact between the filter belt and the exhaust plenum. A cleaning device removes the excess powder from the one face of the filter belt; which powder, through a separator, is collected in a supply container for reapplication to the workpiece.

10 Claims, 5 Drawing Figures

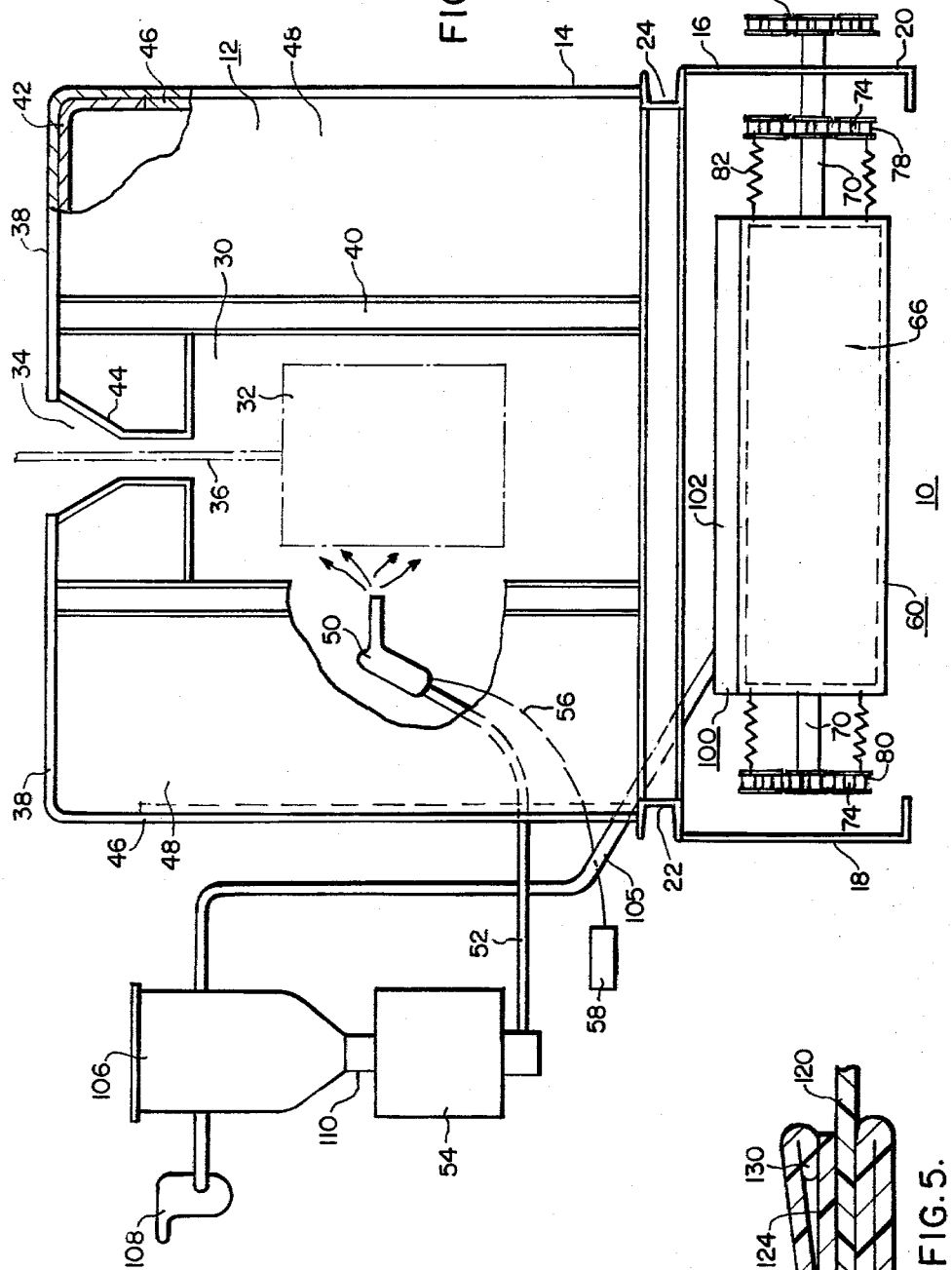
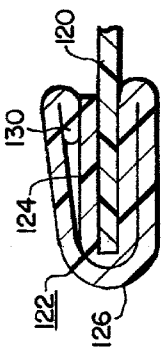

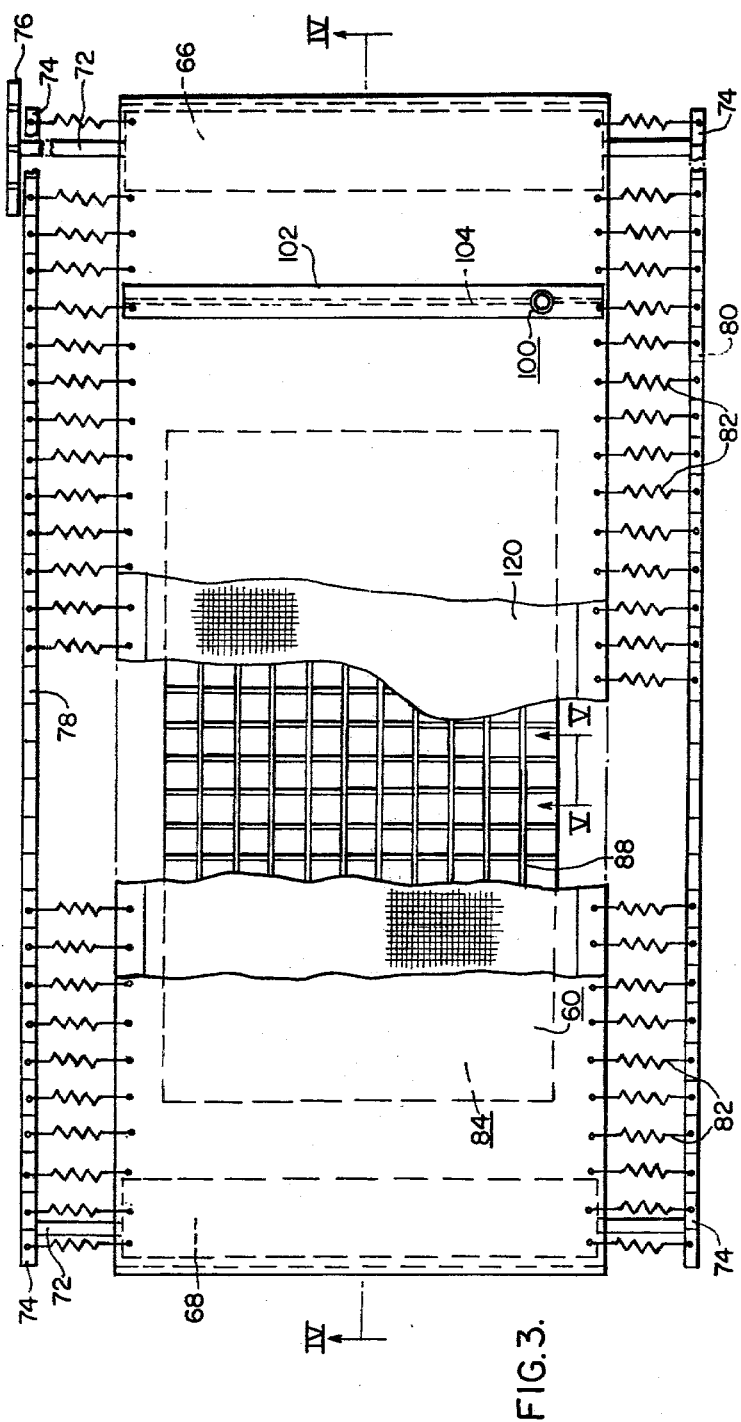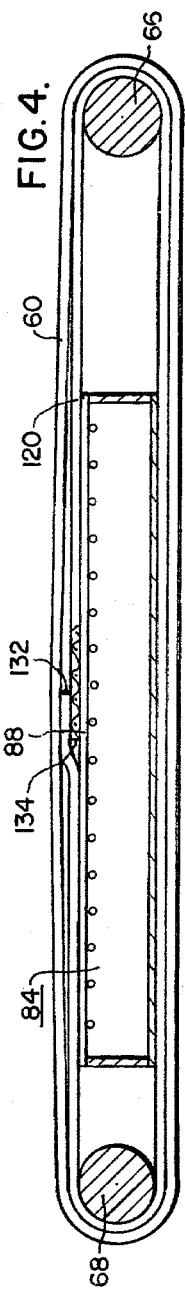

ELECTROSTATIC POWDER COATING INSTALLATION

BACKGROUND OF THE INVENTION

1. Field of the Invention

This invention relates, in general, to electrostatic powder coating and, more specifically, to the construction of an electrostatic powder coating installation.

2. Description of the Prior Art

One of the more important processes for applying coating materials to commerical products is the use of electrostatic powder coating techniques. Briefly, this technique involves the application, such as by spraying, of powder particles, which have a predetermined electrical charge applied thereon, to a workpiece which is at ground potential. The charged powder particles are attracted to the workpiece and form a uniform coating therearound which is subsequently fused by the application of heat to form a solid homogeneous coating.

In the electrostatic powder coating process, relatively large portions of the released electrostatically charged powder do not impinge upon the workpiece or do not have sufficient adherence thereto, for instance, because the desired layer thickness has already been attained on the workpiece. This portion, or excess powder, deposits like dust on the parts of the installation or spray booth. This dust must be removed to prevent undesirable buildup or for possible reapplication to the workpiece.

A state-of-the-art installation in which the excess powder or overspray is continuously collected is illustrated in U.S. Pat. No. 3,918,641. The electrostatic powder coating installation depicted therein consists of an enclosure in which there are arranged means, coupled with a spray container, for the purpose of delivering electrostatically charged powder. A part of the interior of the enclosure is bounded by one face of a filter belt moving through the enclosure; the other face of which is in confronting relationship with the suction side of a suction device which is effective through the filter at the aforementioned interior of the enclosure. A cleaning device is associated in operative relationship with the filter belt for removing therefrom excess powder which has been deposited on one face thereof.

In this installation, the greatest portion of the excess powder falls onto the filter belt under the action of the suction device so that the remaining parts of the installation are considerably less contaminated by deposits of the powder. By means of the cleaning device, the excess powder is removed from the filter belt and delivered to a collecting or supply container. The cleaning device is equipped with a suction nozzle directed towards one face of the filter belt. The suction nozzle is connected through a separator to the suction side of a blower with the outlet of the separator connected to the supply container. In this manner, the excess powder and exhaust air within the enclosure are drawn, under the influence of the suction blower, to the filter belt which has a predetermined permeability such that the air is purified of the excess powder as it is drawn through the filter belt and withdrawn from the enclosure; while the powder is collected on the surface of the filter belt and recovered by the cleaning device for reapplication to the workpiece.

Although such an installation provides economical operation insofar as removing and collecting the excess powder from the enclosure and reapplying the powder to the workpiece in a continuous operation, considerable difficulties have been encountered in attaining acceptable reliability or useful life of the filter belt. The downward pressure exerted by the suction blower on the powder and air within the enclosure causes the filter belt to be forced into engagement with the top surface of an exhaust plenum, which is typically covered by wire screen or grate. The sliding action of the filter belt over the wire screen as it moves through the enclosure causes rapid abrasion of the filter belt necessitating replacement of the filter belt after a relatively short interval of use. Not only does the replacement of the filter belt require considerable down time of the powder coating installation, but also additional expense is incurred in order to refurbish the worn filter belt or to purchase additional belts which decreases the economical advantages afforded by powder coating techinques over other types of coating methods.

Thus, it is desirable to provide an electrostatic powder coating installation having a movable filter belt for continuously collecting excess powder within the enclosure in which abrasion of the filter belt caused by the sliding contact between the filter belt and the exhaust plenum, as the belt moves through the enclosure, is minimized. It is also desirable to provide the aforementioned electrostatic powder coating installation in which abrasion of the filter belt is minimized and, at the same time, the filtering characteristics of the filter belt remain unchanged.

SUMMARY OF THE INVENTION

Briefly, the present invention is an electrostatic powder coating installation having a movable filter belt extending through the interior of an enclosure. A suction device is operably connected through an exhaust plenum disposed beneath the portion of the filter belt within the enclosure and causes air and excess powder within the enclosure to be drawn towards one face of the filter belt. The filter belt has a predetermined permeability so as to allow the passage of air therethrough to the exhaust plenum and to collect the excess powder on the one face thereof. A cleaning device removes the excess powder from the one face of the filter belt and, through a separator, directs the excess powder to a supply container for reapplication to the workpiece.

A second movable belt is disposed in registry with the second face of the filter belt so as to space or separate the filter belt from the top surface of the exhaust plenum and thereby prevent sliding contact between the filter belt and the exhaust plenum which, in prior art installations, has resulted in rapid abrasion of the filter belt as the filter belt moves through the enclosure. The second belt is formed of a coarse, monofilament, synthetic material arranged in a mesh or screen and having a permeability greater than or equal to the permeability of the filter belt. Since the second belt prevents the abrasion of the filter belt, the useful life of the filter belt is extended which decreases the amount of down time required to replace the filter belt in prior art installations and, further, reduces the repair and replacement costs of the filter belts.

BRIEF DESCRIPTION OF THE DRAWING

The various features, advantages and other uses of this invention will become more apparent by referring to the following detailed description and drawing, in which:

FIG. 2 is an end view of the powder coating installation shown in FIG. 1;

FIG. 3 is a sectional view, generally taken along line III—III of FIG. 1, showing the detailed construction of the filter and screen belts;

FIG. 4 is a side view of the filter and screen belts shown in FIG. 3; and

FIG. 5 is a sectional view, generally taken along line V—V in FIG. 3.

DESCRIPTION OF THE PREFERRED EMBODIMENT

Figure 1:
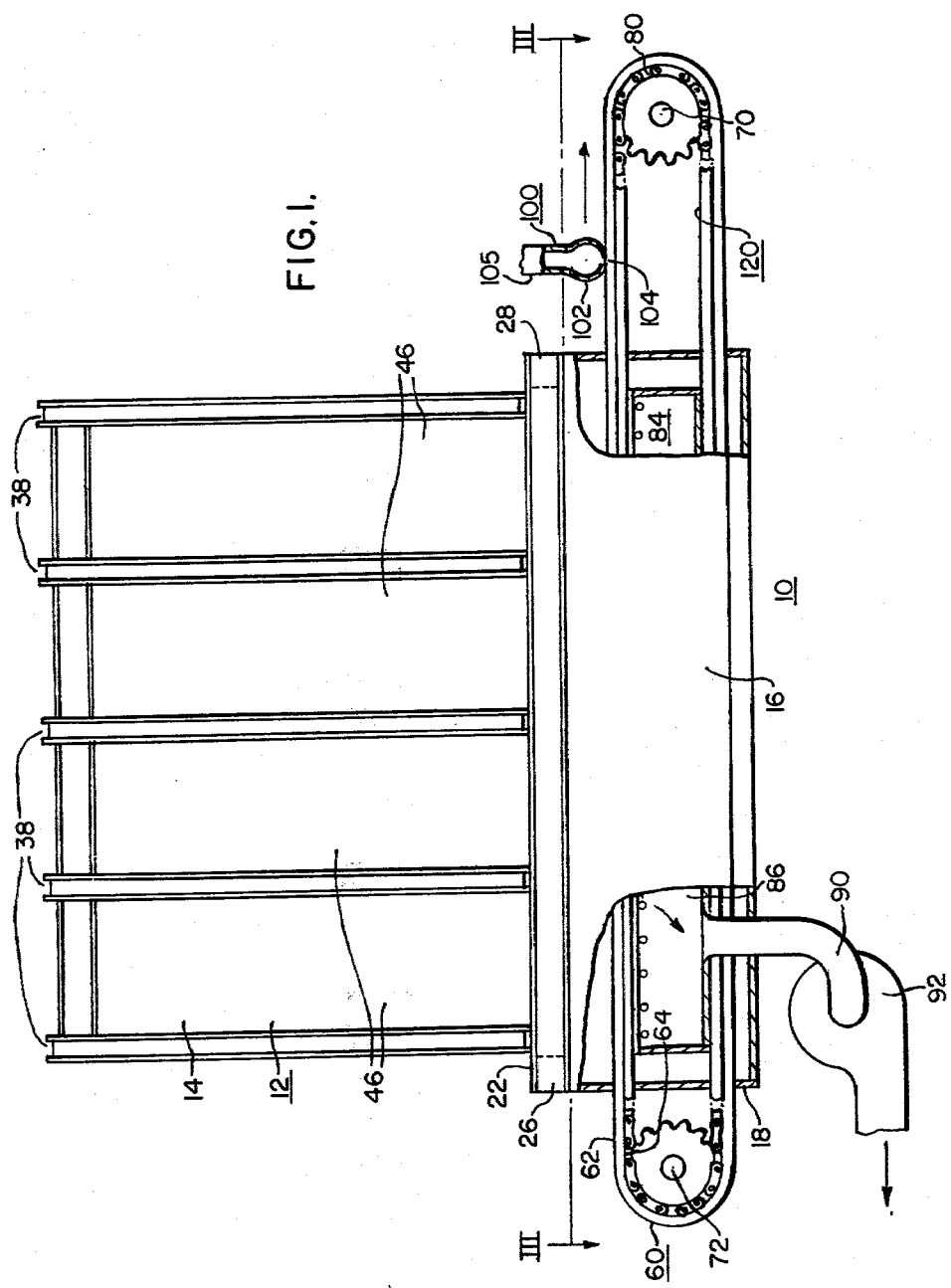
FIG. 1 is an elevational view of a powder coating installation constructed according to the teachings of this invention, with portions broke away to illustrate details of the construction.

Throughout the following description, identical reference numbers refer to the same component or member shown in all figures of the drawing.

Referring now to the drawing, and to FIGS. 1 and 2 in particular, there is shown a powder coating installation 10 constructed according to the teachings of this invention. The installation 10 includes an enclosure 12 consisting of upper and lower sections 14 and 16, respectively. The lower section 16, sometimes referred to as the hopper section, includes legs 18 and 20, to which are welded or otherwise secured an assembly of side rails 22 and 24 and end rails 26 and 28 which comprise a rigid support structure for the upper housing section 14 of the enclosure 12.

The upper section 14 of the spray booth 12 is formed in two symmetrical halves providing therebetween a passage, including end openings 30, for a workpiece 32 and providing a slot-like opening 34 in the top of the housing to accommodate the lengthwise passage of a conveyor 36. Each of the symmetrical upper housings halves includes a plurality of rib elements 38, which may be formed of structural channels or tubing, for example, and which include side and top portions connected by curved upper corner sections. At the extreme ends, vertical support elements 40 may be provided to add rigidity to the end-most rib sections 38 as well as to provide support for the end panels of the housing, as described hereinafter.

Welded or otherwise secured to the inside surfaces of the top portion of the rib elements 38 are roof panels 42. The roof panels 42 include a flange portion 44 which forms the conveyor receiving opening 34 at the extreme ends of the enclosure 10. Further, a plurality of side panels 46 are joined, such as by welding, between adjacent ones of the vertically extending ribs 38. In addition, end panels 48 are welded between the vertical supports 40 at the extreme ends of the enclosure 12 to define the end openings 30 of the enclosure panel.

Within the interior the upper portion 14 of the enclosure 10, there is arranged at least one spray nozzle, for instance, in the form of a spray gun 50, the outlet end of which is directed towards the workpiece 32. The spray gun 50 is connected by a connection line 52, such as a hose or conduit, with a supply container 54 and by means of an delivery line 56 to a voltage source 58. By means of the hose 52, there is delivered to the spray gun 50 through the use of conveying air, the powder which is to be electrostatically charged. Through the delivery line 56, there is furnished the electrical energy needed to electrostatically charge the powder.

In the lower housing 16 of the enclosure 10, there is disposed a movable filter belt 60, as shown in FIGS. 1, 2 and 3. The filter belt 60 has first and second opposing faces 62 and 64, respectively, with the first face 62 bounding the interior of the enclosure 10. The ends of the filter belt 60 are joined together to form a continuous loop which is guided around rollers 66 and 68 disposed at opposite ends of the installation 10. Each of the rollers 66 and 68 are concentrically disposed around operating shafts 70 and 72, respectively, which further include sprokets 74 at the ends thereof. One of the rollers, such as roller 66, may be driven in a predetermined direction by means of a suitable drive source, such as a motor (not shown), which is connected to the operating shaft 70 of roller 66. Drive chains 78 and 80 are operably coupled to the sprockets 74 joined to the operating shafts 70 and 72 of the rollers 66 and 68, respectively. The filter belt 60 is connected by a plurality of springs 82 to the drive chains 78 and 80 such that the application of force by the drive source to the operating shaft 70 of roller 66 will cause the filter belt 60 to move in a predetermined direction of travel through the enclosure 10.

The second surface 64 of the filter belt 60 faces the open or suction side of a suction device 84. The suction device 84 includes an exhaust plenum 86 in the form of a vat or trough. A grate or wire screen 88 forms the top of the trough 86. The interior of the trough 86 is connected by means of a connection line 90 with the suction side of an exhaust blower 92.

During the powder coating operating, relatively large portions of the released electrostatically charged powder from the spray gun 50 do not impinge upon the surface of the workpiece 32 or do not have sufficient adherence thereto, for instance, because the desired layer thickness has already been obtained on the workpiece 32. The exhaust blower 92 exerts a negative pressure within the enclosure 10 which serves to draw the excess powder and air within the enclosure 10 towards the filter belt 60. The filter belt 60 is constructed of selected material having a predetermined permeability so as to allow the passage of air therethrough into the interior of the exhaust plenum 86 and then through the exhaust blower 92 to the ambient atmosphere; while the excess powder is deposited on the first face 62 of the filter belt 60. The permeability of the filter belt 60 is selected to prevent substantial penetration of the powder through the filter belt.

During the course of its movement, the filter belt 60 leaves the interior of the enclosure 12 and carries along therewith the excess powder which has collected on its first face 62 of the filter belt 60 during its passage through the enclosure 12. A cleaning means 100 is provided outside the enclosure 12 to remove the excess powder from the first face 62 of the filter belt 60. The cleaning means 100 includes a cylindrical tube 102 which extends substantially across the entire width of the filter belt 60 and, further, is disposed in close proximity to the first face 62 of the filter belt 60. The cylindrical tube 102 includes a suction slot 104 facing the first face 62 of the filter belt 60 along the entire length of the cylindrical tube 102. The cylindrical tube 102 is connected by a connection tube or conduit 105 through a separator 106 to the suction side of a blower 108, as shown in FIG. 2. The blower 108 creates a suction or vacuum effect which removes the excess powder from the first face 62 of the filter belt 60 through the tube 102 and conduit 105 to the separator 106, wherein the powder is separated or filtered from the exhaust air. The outlet 110 of the separator 106 is connected to the supply container 54 to thereby return the excess powder to the supply container 54 for eventual reapplication to the workpiece 32.

In prior art powder coating installations of this type, the suction created by the exhaust blower 92 through the exhaust plenum 86 causes the second face 64 of the filter belt 60 to be drawn in contact with the wire grate 88 forming the top surface of the exhaust plenum 86. This contact between the second face 64 of the filter belt 60 and the wire grating 88 as the filter belt 60 moves through the enclosure 12 results in considerable abrasion of the filter belt 60. Typically, the second face 64 of the filter belt 60 has a nylon mesh bonded thereto for dimensional stability. The abrasion resulting from the contact between the second face 64 of the filter belt 60 and the wire grating 88 of the exhaust plenum 86 causes the nylon mesh to quickly deteriorate. This causes considerable down time for the powder coating installation since the filter belt 60 must be removed and replaced at frequent intervals. In addition, considerable expense is incurred through the necessary purchase of additional filter belts or the refurbishing of worn out belts.

It is the purpose of this invention to minimize the abrasion and deterioration of the filter belt 60 by interposing a second belt of coarse material between the filter belt 60 and the wire grating 88 forming the top of the exhaust plenum 86. In this manner, the filter belt 60 is spaced from the exhaust plenum 86 which, thereby, minimizes abrasion thereon as the filter belt 60 moves through the enclosure 12 and increases the useful life of the filter belt 60.

Referring now to FIGS. 3 and 4, there is shown detailed views of the construction of the second belt 120. According to the preferred embodiment of this invention, the second belt 120 is formed of a coarse, synthetic material having good abrasion resistance properties. More particularly, the second belt 120 is formed of a monofilament material formed in a web or screen. It has been found that a monofilament material provides better wear characteristics than multifilament materials since such material is available in larger strand diameters than multifilament screen materials. Preferably, the permeability or average opening of the second belt 120 must be the same or greater than the permeability of the material used to form the filter belt 60 so as not to interfere with the passage of exhaust air through the filter belt 60.

Materials which are suitable for forming the second belt 120 include, for example, polyester and nylon, both of which possess excellent abrasion resistance properties. More specifically, the second belt 120 may be formed of monofilament polyester strands arranged in a screen or web, such as a polyester screen material sold by Tetko, Inc., Elmsford, New York, under Model No. ASTM 7-18-1000 PeCap. A screen material of this type has approximately 16.9 openings per linear inch of material with an average opening size of 1000 microns.

In constructing the second belt 120 of the aforementioned polyester materiial, both the lateral ends and the longitudinal edges are bound to prevent unraveling of the individual strands. A suitable means for binding the ends and edgess of the second belt 120 is illustrated in FIG. 5. A polyester material 122, such as a material sold under Model No. PE1100SK-20 by Tetko, Inc., is disposed around the ends and edges of the second belt 120 in two layers. The innermost layer 124 may be stitched to the second belt 120 with the second layer 126 protecting the stitches from contact with the wire grate 88 forming the top of the exhaust plenum 86. Similarly, the ends of the material 122 are stitched at location 130 such that the outer layer 126 again protects the stitches from contact with the wire grate 88. For ease of assembly, the lateral ends 132 and 134 of the second belt 120 need not be joined together but may be overlapped, as shown in FIG. 4, to form a continuous loop between the filter belt 60 and the exhaust plenum 86.

In summary, there is disclosed herein an electrostatic powder coating installation having a movable filter belt extending through an enclosure to collect excess powder in which a second belt is disposed between one face of the filter belt and the suction side of the exhaust plenum within the enclosure. The second belt prevents contact between the filter belt and the exhaust plenum which minimizes the abrasion of the filter belt experienced in similar prior art installations as the filter belt continuously moves through the enclosure. The second belt is formed of a coarse, monofilament, synthetic material having good abrasion resistance properties, and further, has a permeability or average opening size greater than or equal to the permeability of the filter belt so as not to interfere with the flow of exhaust air through the filter belt. By eliminating the abrasion of the filter belt, down time of the powder coating installation is significantly reduced and, further, the useful life of the filter belt is increased thereby minimizing repair costs.

What is claimed is:

1. An eletrostatic powder coating installation comprising:

an enclosure;

a supply container;

means operably coupled with said supply container for delivering electrostatically charged powder into the interior of said enclosure;

a filter belt movable in a predetermined direction of travel through said enclosure, said filter belt having first and second opposing faces with said first face bounding said interior of said enclosure;

a second belt movable in said predetermined direction of travel through said enclosure, said second belt having first and second opposing faces with said first face of said second belt disposed in registry with said second face of said filter belt, said second belt being formed of a harder, more abrasive resistant material than said filter belt;

a suction device having a suction side, including means for supporting both said second belt and said filter belt in a predetermined plane in the interior of said enclosure, said suction device being effective through said means for supporting said belts, said second belt and said filter belt for attracting excess powder from the interior of said enclosure to said first face of said filter belt, said second belt being disposed between said means for supporting said belts and said filter belt with said second face of said second belt confronting said means for supporting said belts, to prevent contact between said second face of said filter belt and said means for supporting said belts;

a cleaning device operably associated with said filter belt for removing excess powder which has deposited on said first face of said filter belt, said cleaning device having a suction nozzle directed towards said first face of said filter belt;

a suction blower having a suction side; and a separator;

said suction nozzle being connected by means of said separator with said suction side of said suction blower, said separator having an outlet disposed in flow communication with said supply container.

2. The installation of claim 1 wherein the filter belt has a predetermined permeability, and the second belt is formed of a monofilament material arranged to form a screen having a permeability at least equal to the permeability of the filter belt.

3. The installation of claim 2 wherein the monofilament material is polyester.

4. The installation of claim 2 wherein the monofilament material is nylon.

5. The installation of claim 1 wherein the lateral ends of the second belt are disposed in overlapping relationship.

6. A filter belt assembly for removing powder from the interior of an enclosure comprising:
   a filter belt movable in a predetermined direction of travel through said enclosure, said filter belt having first and second opposing faces with said first face bounding the interior of said enclosure;
   a second belt formed of a harder more abrasive resistant material than said filter belt and movable in said predetermined direction of travel through said enclosure, said second belt having first and second opposing faces with said first face of said second belt disposed in registry with said second face of said filter belt; and
   means for supporting both said second belt and said filter belt in a predetermined plane in the interior of said enclosure;
   said second belt being disposed between said means for supporting said belts and said filter belt with said second face of said second belt confronting said means for supporting said belts, to prevent contact between said second face of said filter belt and said means for supporting said belts.

7. The assembly of claim 6 wherein the filter belt has a predetermined permeability, and the second belt is formed of a monofilament material arranged to form a screen having a permeability at least equal to the permeability of the filter belt.

8. The assembly of claim 7 wherein the monofilament material is polyester.

9. The assembly of claim 7 wherein the monofilament material is nylon.

10. The assembly of claim 7 wherein the lateral ends of the second belt are disposed in overlapping relationship.

* * * * *